(No Model.)
M. HARDSOCG.
COAL DRILL.
No. 513,320. Patented Jan. 23, 1894.
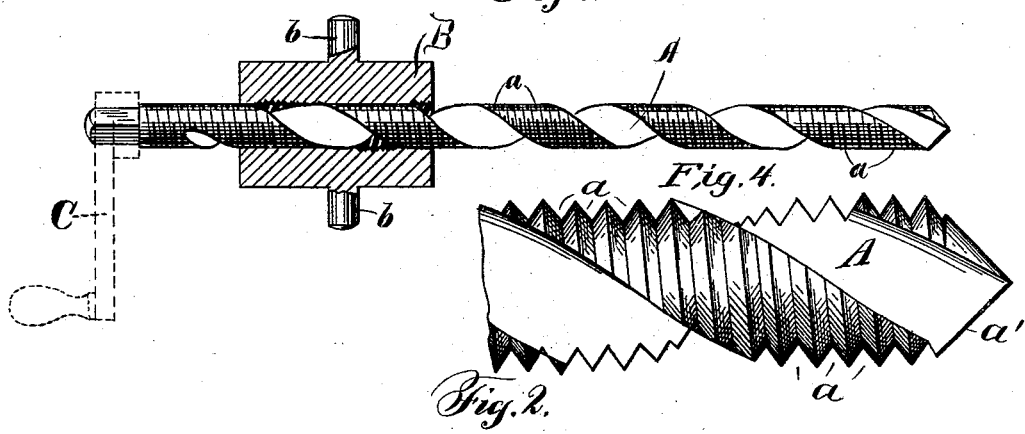
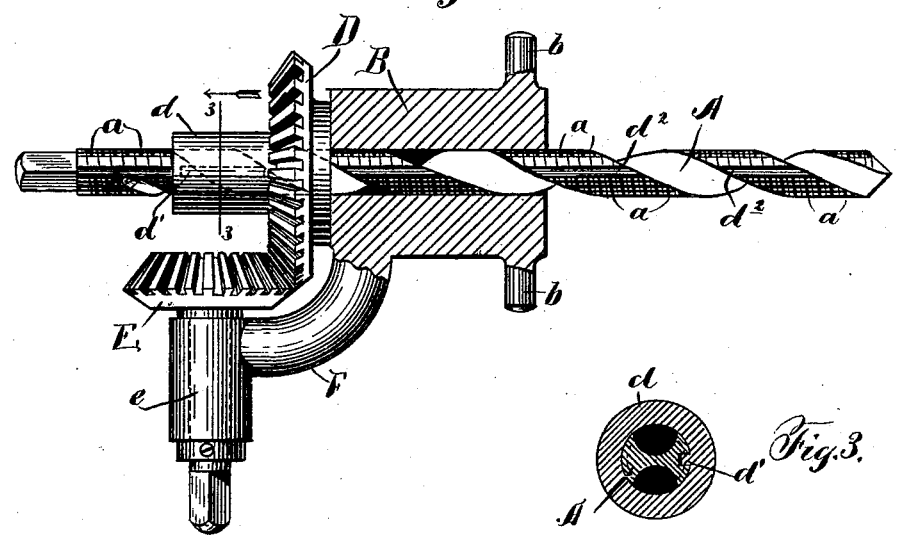
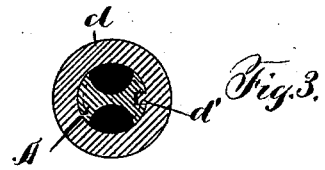
Witnesses,
Thos. F. Sheridan
Samuel E. Hibben
Inventor.
Martin Hardsocg.
By Banning and Banning and Payson,
Attorneys.

UNITED STATES PATENT OFFICE.

MARTIN HARDSOCG, OF OTTUMWA, IOWA.

COAL-DRILL.

SPECIFICATION forming part of Letters Patent No. 513,320, dated January 23, 1894.

Application filed November 1, 1892. Serial No. 450,610. (No model.)

*To all whom it may concern:*

Be it known that I, MARTIN HARDSOCG, a citizen of the United States, residing at Ottumwa, Iowa, have invented certain new and useful Improvements in Coal-Drills, of which the following is a specification.

The object of my invention is to make a coal drill that may be of any length desired to permit it to drill a hole of the desired depth without having to withdraw the drill from time to time to insert a longer one; and my invention consists in the features and details of construction hereinafter described and claimed.

In the drawings, Figure 1 is a side elevation partly in section of my improved coal drill and the nut or block through which it is advanced. Fig. 2 is a side elevation partly in section of the same with different driving mechanism; and Fig. 3 is a plan view of a cross section taken in the line 3 of Fig. 2, looking in the direction of the arrow, and Fig. 4 is an exaggerated detail view of a portion of my improved coal drill.

In making my improved coal drill, I make a twist drill, A, that may be of any desired length or diameter, corresponding to the depth and size of the hole which it is desired to drill. The drill is pointed or otherwise properly shaped at the end to enable it to penetrate the coal with facility, and it is provided on its surface with screw threads $a$. The drill is intended to be supported in a block or nut, B, which is provided with trunnions, $b$, to enable it to be held or supported in a suitable frame. The block or nut has a hole of suitable size to permit the drill to pass through it, and is provided with screw threads in the hole engaging with the screw threads on the surface of the drill, so that as the drill is turned by a handle C, it will be advanced through the hole of the block or nut to penetrate the coal. As the drill enters the coal, the screw threads on its surface will of course engage with the coal, and tend to draw or pull the drill in, and thus assist the forcing action of the screw threads in the nut or block. In some cases it may be found desirable to entirely omit the screw threads in the block and depend upon the drawing or pulling action of the screw threads on the surface of the drill as it penetrates the coal.

In Fig. 2 I have arranged a bevel gear, D, on the drill, and provided it with a hub, $d$, carrying a spline, $d'$, which engages with a channel or groove, $d^2$, in the surface of the drill, so as to secure the rotation of the bevel gear and drill together. I have provided a pinion, E, mounted on a shaft, $e$, supported in an arm or bracket, F, to permit the teeth of the pinion to engage with the teeth of the bevel gear, so as to impart rotation to it. The shaft $e$ and pinion E may be rotated with any convenient motive power. In Fig. 2 I have dispensed with the screw threads in the nut or block, and used it simply as a support or guide through which the drill may be advanced, through the engagement of its screw threads, with the coal which it is penetrating. If preferred, however, the block or nut may be provided with screw threads, as is the case in Fig. 1. The borings produced by the penetration of the drill in the coal, will be carried back through the spiral channel in the drill, and be deposited outside. If desired, the bit or cutting portion of the tool, may be made separate and removable from the end of the drill, so that as one bit becomes worn it may be replaced by a new one.

As coal is more or less brittle and friable, I desire it understood that the coal drill should be made sufficiently large to have coarse or deep threads on its surface to cause it to take hold of the coal and thus be drawn or advanced forward as it is rotated.

In Fig. 4 I have shown a portion of my improved drill on a greatly enlarged scale in order to clearly illustrate the screw threads on the outer cutting surface or body of the drill, which extend clear through to the cutting point $a'$. The cutting point of the drill removes that part of the material equal to the diameter of the bottom of the thread while the screw threads engaging with the coal, assist the advancement of the drill at a speed equal to their pitch.

What I regard as new, and desire to secure by Letters Patent, is—

1. In coal drills, the combination of a drill the shank or body of which is provided with screw threads adapted to engage with the coal and assist in causing the drill to penetrate the coal, and means for guiding and rotating the drill.

2. In coal drills, the combination of a drill the shank or body of which is provided with screw threads adapted to engage with the coal and assist the nut in causing the drill to penetrate the coal, a nut provided with a threaded hole engaging with the screw threads on the drill, and means for rotating the drill, substantially as described.

3. In coal drills, the combination of a drill the shank or body of which is provided with screw threads adapted to engage with the coal and assist in causing the drill to penetrate the coal, a longitudinal groove or channel in said drill, a spur gear provided with a spline resting in the groove or channel of the drill to effect their rotation, and means for rotating the gear, substantially as described.

MARTIN HARDSOCG.

Witnesses:
 THOMAS A. BANNING,
 SAMUEL E. HIBBEN.